United States Patent
Huang et al.

(10) Patent No.: US 10,912,014 B2
(45) Date of Patent: Feb. 2, 2021

(54) DATA TRANSMISSION METHOD AND DEVICE

(71) Applicant: China Academy of Telecommunications Technology, Beijing (CN)

(72) Inventors: Qiuping Huang, Beijing (CN); Qiubin Gao, Beijing (CN); Runhua Chen, Beijing (CN); Hui Li, Beijing (CN); Tamrakar Rakesh, Beijing (CN); Yang Song, Beijing (CN); Mengjun Wang, Beijing (CN); Chuanjun Li, Beijing (CN); Xin Su, Beijing (CN); Yu Yang, Beijing (CN)

(73) Assignee: China Academy of Telecommunications Technology, Beijing (CN)

( * ) Notice: Subject to any disclaimer, the term of this patent is extended or adjusted under 35 U.S.C. 154(b) by 27 days.

(21) Appl. No.: 16/319,807

(22) PCT Filed: Jun. 8, 2017

(86) PCT No.: PCT/CN2017/087511
§ 371 (c)(1),
(2) Date: Jan. 22, 2019

(87) PCT Pub. No.: WO2018/014669
PCT Pub. Date: Jan. 25, 2018

(65) Prior Publication Data
US 2019/0281538 A1    Sep. 12, 2019

(30) Foreign Application Priority Data
Jul. 22, 2016  (CN) .......................... 2016 1 0587543

(51) Int. Cl.
*H04W 48/16* (2009.01)
*H04J 11/00* (2006.01)
*H04L 27/26* (2006.01)

(52) U.S. Cl.
CPC ......... *H04W 48/16* (2013.01); *H04J 11/0069* (2013.01); *H04L 27/2649* (2013.01); *H04L 27/2666* (2013.01)

(58) Field of Classification Search
CPC .............. H04W 48/16; H04L 27/2649; H04L 27/2666; H04J 11/0069
See application file for complete search history.

(56) References Cited

U.S. PATENT DOCUMENTS

2011/0256868 A1* 10/2011 Nogami ............... H04J 11/0069
                                                      455/435.1
2012/0100880 A1*  4/2012 Baek ..................... H04W 48/16
                                                      455/515

(Continued)

FOREIGN PATENT DOCUMENTS

CN          101001234 A          7/2007
CN          102186251 A          9/2011
                   (Continued)

OTHER PUBLICATIONS

Intel Corporation: "Beam support in NR", 3GPP Draft; R2-162709, 3rd Generation Partnership Project (3GPP), Mobile Competence Centre ; 650, Route Des Lucioles ; F-06921 Sophia-Antipolis Cedex; France vol. RAN WG2, No. Dubrovnik , Croatia; Apr. 11, 2016-Apr. 15, 2016, Apr. 2, 2016 (Apr. 2, 2016); XP051082507, 4 pages.

*Primary Examiner* — Shukri Taha
(74) *Attorney, Agent, or Firm* — Kilpatrick Townsend & Stockton, LLP

(57) ABSTRACT

Disclosed are a data transmission method and device. The method comprises: a sending end sending at least one synchronization signal (SI), with the SI carrying a first identifier; and at a time-frequency location of system information corresponding to the SI, sending the system information, the system information carrying information for indicating a second identifier, and identification information about the sending end comprising the first identifier and the second identifier. According to a mapping relationship between an SI and a first identifier, a receiving end can obtain the first identifier after detecting the SI; and by means (Continued)

of carrying information for indicating a second identifier in system information, the receiving end can obtain the second identifier after detecting the system information, so that the receiving end can obtain all the identification information about the sending end according to the first identifier and the second identifier.

20 Claims, 3 Drawing Sheets

(56) References Cited

U.S. PATENT DOCUMENTS

2013/0064239 A1* 3/2013 Yu ..................... H04W 72/046
                                                          370/350
2016/0309509 A1* 10/2016 Yan ..................... H04W 16/04

FOREIGN PATENT DOCUMENTS

| CN | 105635018 A | 6/2016 |
| CN | 106507442 A | 3/2017 |
| EP | 2919502 A1 | 9/2015 |
| JP | 2014-532320 A | 12/2014 |
| KR | 20120001598 A | 1/2012 |
| TW | 200952451 A | 12/2009 |
| TW | 201021606 A | 6/2010 |
| TW | 201347482 A | 11/2013 |
| WO | 2014059801 A1 | 4/2014 |
| WO | 2014179955 A1 | 11/2014 |
| WO | 2015080646 A1 | 6/2015 |
| WO | 2015160856 A1 | 10/2015 |

* cited by examiner

DATA TRANSMISSION METHOD AND DEVICE

This application is a National Stage of International Application No. PCT/CN2017/087511, filed Jun. 8, 2017, which claims priority to Chinese Patent Application No. 201610587543.7, filed Jul. 22, 2016, both of which are hereby incorporated by reference in their entireties.

FIELD

The present invention relates to the field of communications, and particularly to a method and apparatus for transmitting data.

BACKGROUND

A communication system includes at least one network node, and at least one User Equipment (UE) communicating therewith. After the UE is powered on, in order to access a network, the UE shall locate at least one network node, and access the network through the network node. If a network includes a plurality of network nodes, then UE may access the network through any one of the plurality of network nodes. Taking a cellular system as an example, a network node is configured as a cell, each cell transmits a different signal, and the UE detects signals of different cells, selects appropriate one of the cells, and accesses the network. This procedure is referred to as an initial access. In the cellular system, the UE may also need to identify a cell, i.e., to identify an appropriate cell to reside in or to report a handover request to a base station, during cell reselection or in a connected state in addition to identifying a cell, i.e., locating an appropriate network node, during an initial access.

In a Long Term Evolution (LTE) system, a synchronization signal carries identification information of a cell, and the synchronization signal of the LTE system includes a Primary Synchronization Signal (PSS) and a Secondary Synchronization Signal (SSS). A base station serving the cell can include one or more transmitting antennas, and a PSS/SSS is transmitted over the plurality of antennas after being beam-formed. Since the PSS/SSS is designed for all the UEs in the cell to access the cell, a beam-forming scheme shall be designed for wide beam-forming so that the PSS/SSS can be received by all the users in the cell. Accordingly a cell transmits a PSS/SSS, and there is a one-to-one correspondence relationship between this signal and a cell identifier (ID) of this cell. Each UE detecting a PSS/SSS of a cell obtains the cell ID of the corresponding cell, and identifies the cell.

Existing communication systems are generally deployed in a low frequency band, and there are a small number of antennas at the network node side. Future communication systems will be deployed at a frequency band of 0.4 GHz to 100 GHz and even higher. There is a such a difference in propagation performance between a low frequency band below 6 GHz, and a high frequency band above 6 GHz that a path loss in the high frequency band is much higher than that in the low frequency band, and for example, a path loss at a carrier frequency 26 GHz is 20 dB higher than that at a carrier frequency 2.6 GHz under an apparent distance condition over the same propagation distance. Given a same Effective Isotropic Radiated Power (EIRP), a coverage area of a signal in the high frequency band is narrowed dramatically, and the existing design of synchronization and initial access signals cannot guarantee sufficient network coverage.

In order to guarantee sufficient network coverage, there may be a plurality of Transmit or Receive Point (TRP) in a cell of a future system. Moreover, the number of antennas in the future system will grow dramatically to hundreds and even thousands, a large number of antennas can produce narrowly formed beams through beam-forming, and an intra-beam coverage area can be improved due to a beam gain. However, since the beams are narrowed, there will be a smaller angle which can be covered by each beam, and the cell shall be provided with a plurality of beams to point to different directions so that the entire cell can be covered. In the future system, the UE may also need to identify a TRP and a beam in addition to a cell.

In summary, as there is a growing density of deployment in the network, there will be an increasing number of TRPs and an increasing number of beams, so it will be more complex to transmit and identify identification information of a network node.

SUMMARY

Embodiments of the invention provide a method and apparatus for transmitting data so as to address the problem of becoming more complex to transmit and identify identification information of a network node because there will be an increasing number of TRPs and an increasing number of beams.

In a first aspect, an embodiment of the invention provides a method for transmitting data, the method including: transmitting, by a transmitter, at least one synchronization signal (SI) carrying a first identifier; and transmitting, by the transmitter, system information corresponding to the SI at a time-frequency position of system information, corresponding to the SI, wherein the system information corresponding to the SI carries information representing a second identifier; wherein identification information of the transmitter includes the first identifier and the second identifier.

Optionally, carrying the first identifier in the SI includes: generating a sequence of the SI according to the first identifier; or scrambling the SI using the first identifier; or carrying information representing the first identifier in bit information in the SI.

Optionally, the method further includes: scrambling, by the transmitter, the system information corresponding to the SI using the first identifier; or generating, by the transmitter, a reference signal of the system information corresponding to the SI according to the first identifier.

Optionally, the transmitter determines the time-frequency position of system information, corresponding to the SI as follows: the transmitter determines the time-frequency position of system information, corresponding to the SI according to a time-frequency position of the SI and a first mapping relationship, wherein the first mapping relationship characterizes a correspondence relationship between the time-frequency position of the SI and the time-frequency position of system information; or the transmitter determines the time-frequency position of system information, corresponding to the SI according to the first identifier and a second mapping relationship, wherein the second mapping relationship characterizes a correspondence relationship between the first identifier corresponding to the SI, and the time-frequency position of system information, corresponding to the SI; or the transmitter determines the time-frequency position of system information, corresponding to the SI according to a predefined set of time-frequency positions, wherein the set of time-frequency positions includes the time-frequency position of system information, corresponding to the SI.

Optionally, if there are at least two time-frequency positions of system information, corresponding to the SI, then the method further includes: selecting, by the transmitter, one of the at least two time-frequency positions as the time-frequency position of system information, corresponding to the SI.

Optionally, the information representing the second identifier is the second identifier; or the information representing the second identifier, and the second identifier satisfies a predefined first constraint condition; or the information representing the second identifier, the first identifier, and the second identifier satisfies a predefined second constraint condition.

Optionally, the SI includes at least two sub-signals, the first identifier includes at least two first sub-identifiers, each sub-signal corresponds to one of the first sub-identifiers, and different sub-signals correspond to different first sub-identifiers.

Optionally, the first identifier includes at least one of following information: identification information identifying an area where the transmitter is located, identification information identifying the transmitter, or identification information identifying a beam for the transmitter to transmit the SI; and the second identifier includes at least one of following information: the identification information identifying the area where the transmitter is located, the identification information identifying the transmitter, or the identification information identifying the beam for the transmitter to transmit the SI.

In a second aspect, an embodiment of the invention provides a method for receiving data, the method including: determining, by a receiver, a first identifier carried in at least one synchronization signal (SI) upon detecting the SI; detecting, by the receiver, system information corresponding to the SI; and determining, by the receiver, a second identifier according to the system information, wherein the system information carries information representing the second identifier; wherein identification information of a transmitter transmitting the SI includes the first identifier and the second identifier.

Optionally, determining, by the receiver, the first identifier carried in the at least one SI upon detecting the SI includes: determining, by the receiver, the first identifier according to a sequence of the SI; or determining, by the receiver, a de-scrambling code of the SI as the first identifier; or determining, by the receiver, the first identifier from bit information in the SI, wherein the bit information in the SI carries information representing the first identifier.

Optionally, detecting, by the receiver, the system information at a candidate time-frequency position includes: descrambling, by the receiver, a received signal according to the first identifier; or determining, by the receiver, a reference signal of the system information according to the first identifier, and detecting the system information according to the reference signal.

Optionally, detecting, by the receiver, the system information corresponding to the SI includes: determining, by the receiver, a candidate time-frequency position of system information, corresponding to the SI, and detecting the system information corresponding to the SI at the candidate time-frequency position of system information; wherein the receiver determines the candidate time-frequency position of system information, corresponding to the SI as follows: the receiver determines the candidate time-frequency position of system information, corresponding to the SI according to a time-frequency position of the SI and a first mapping relationship, wherein the first mapping relationship characterizes a correspondence relationship between the time-frequency position of the SI, and a time-frequency position of system information, corresponding to the SI; or the receiver determines the candidate time-frequency position of system information, corresponding to the SI according to the first identifier and a second mapping relationship, wherein the second mapping relationship characterizes a correspondence relationship between the first identifier corresponding to the SI, and a time-frequency position of system information, corresponding to the SI; or the receiver determines the candidate time-frequency position of system information, corresponding to the SI according to a predefined set of time-frequency positions.

Optionally, determining, by the receiver, the second identifier according to the system information includes: determining, by the receiver, the second identifier according to the information representing the second identifier and a predefined first constraint condition; or determining, by the receiver, the second identifier according to the first identifier, the information representing the second identifier and a predefined second constraint condition.

Optionally, the SI includes at least two sub-signals, the first identifier includes at least two first sub-identifiers, each sub-signal corresponds to one of the first sub-identifiers, and different sub-signals correspond to different first sub-identifiers.

Optionally, the first identifier includes at least one of following information: identification information identifying an area where the transmitter is located, identification information identifying the transmitter, or identification information identifying a beam for the transmitter to transmit the SI; and the second identifier includes at least one of following information: the identification information identifying the area where the transmitter is located, the identification information identifying the transmitter, or the identification information identifying the beam for the transmitter to transmit the SI.

In a third aspect, an embodiment of the invention provides a computer readable storage medium storing executable program codes configured to perform the method according to the first aspect.

In a fourth aspect, an embodiment of the invention provides a computer readable storage medium storing executable program codes configured to perform the method according to the second aspect.

In a fifth aspect, an embodiment of the invention provides an apparatus for transmitting data, the apparatus including: a first processing module configured to transmit at least one synchronization signal (SI) carrying a first identifier; and a second processing module configured to transmit system information corresponding to the SI at a time-frequency position of system information, corresponding to the SI, wherein the system information corresponding to the SI carries information representing a second identifier; wherein identification information of a transmitter includes the first identifier and the second identifier.

Optionally, carrying the first identifier in the SI includes: a sequence of the SI is generated according to the first identifier; or the SI is scrambled using the first identifier; or information representing the first identifier is carried in bit information in the SI.

Optionally, the second processing module is further configured to: scramble the system information corresponding to the SI using the first identifier; or generate a reference signal of the system information corresponding to the SI according to the first identifier.

Optionally, the second processing module is further configured to: determine the time-frequency position of system information, corresponding to the SI according to a time-frequency position of the SI and a first mapping relationship, wherein the first mapping relationship characterizes a correspondence relationship between the time-frequency position of the SI, and the time-frequency position of system information; or determine the time-frequency position of system information, corresponding to the SI according to the first identifier and a second mapping relationship, wherein the second mapping relationship characterizes a correspondence relationship between the first identifier corresponding to the SI, and the time-frequency position of system information, corresponding to the SI; or determine the time-frequency position of system information, corresponding to the SI according to a predefined set of time-frequency positions, wherein the set of time-frequency positions includes the time-frequency position of system information, corresponding to the SI.

Optionally, if there are at least two time-frequency positions of system information, corresponding to the SI, then the second processing module is configured to select one of the at least two time-frequency positions as the time-frequency position of system information, corresponding to the SI.

In a sixth aspect, an embodiment of the invention provides an apparatus for transmitting data, the apparatus including a transceiver, and at least one processor connected with the transceiver, wherein the processor is configured to read and execute programs in a memory to: transmit at least one synchronization signal (SI) carrying a first identifier through the transceiver, and transmit system information corresponding to the SI through the transceiver at a time-frequency position of system information, corresponding to the SI, wherein the system information corresponding to the SI carries information representing a second identifier, wherein identification information of a transmitter includes the first identifier and the second identifier; and the transceiver is configured to receive and transmit data under the control of the processor.

Optionally, carrying the first identifier in the SI includes: a sequence of the SI is generated according to the first identifier; or the SI is scrambled using the first identifier; or information representing the first identifier is carried in bit information in the SI.

Optionally, the processor is further configured to read and execute the programs in the memory to: scramble the system information corresponding to the SI using the first identifier; or generate a reference signal of the system information corresponding to the SI according to the first identifier.

Optionally, the processor is further configured to read and execute the programs in the memory to: determine the time-frequency position of system information, corresponding to the SI according to a time-frequency position of the SI and a first mapping relationship, wherein the first mapping relationship characterizes a correspondence relationship between the time-frequency position of the SI, and the time-frequency position of system information; or determine the time-frequency position of system information, corresponding to the SI according to the first identifier and a second mapping relationship, wherein the second mapping relationship characterizes a correspondence relationship between the first identifier corresponding to the SI, and the time-frequency position of system information, corresponding to the SI; or determine the time-frequency position of system information, corresponding to the SI according to a predefined set of time-frequency positions, wherein the set of time-frequency positions includes the time-frequency position of system information, corresponding to the SI.

Optionally, if there are at least two time-frequency positions of system information, corresponding to the SI, then the processor is further configured to read and execute the programs in the memory to: select one of the at least two time-frequency positions as the time-frequency position of system information, corresponding to the SI.

In a seventh aspect, an embodiment of the invention provides an apparatus for receiving data, the apparatus including: a first determining module configured to determine a first identifier carried in at least one synchronization signal (SI) upon detecting the SI; a detecting module configured to detect system information corresponding to the SI; and a second determining module configured to determine a second identifier according to the system information, wherein the system information carries information representing the second identifier; wherein identification information of a transmitter transmitting the SI includes the first identifier and the second identifier.

Optionally, the first determining module is configured to: determine the first identifier according to a sequence of the SI; or determine a de-scrambling code of the SI as the first identifier; or determine the first identifier from bit information in the SI, wherein the bit information in the SI carries information representing the first identifier.

Optionally, the detecting module is configured to: descramble a received signal according to the first identifier; or determine a reference signal of the system information according to the first identifier, and detect the system information according to the reference signal.

Optionally, the detecting module is configured to: determine a candidate time-frequency position of system information, corresponding to the SI, and detect the system information corresponding to the SI at the candidate time-frequency position of system information; wherein the detecting module is configured to determine the candidate time-frequency position of system information, corresponding to the SI by: determining the candidate time-frequency position of system information, corresponding to the SI according to a time-frequency position of the SI and a first mapping relationship, wherein the first mapping relationship characterizes a correspondence relationship between the time-frequency position of the SI, and a time-frequency position of system information, corresponding to the SI; or determining the candidate time-frequency position of system information, corresponding to the SI according to the first identifier and a second mapping relationship, wherein the second mapping relationship characterizes a correspondence relationship between the first identifier corresponding to the SI, and a time-frequency position of system information, corresponding to the SI; or determining the candidate time-frequency position of system information, corresponding to the SI according to a predefined set of time-frequency positions.

Optionally, the second determining module is configured to: determine the second identifier according to the information representing the second identifier, and a predefined first constraint condition; or determine the second identifier according to the first identifier, the information representing the second identifier and a predefined second constraint condition.

In an eighth aspect, an embodiment of the invention provides an apparatus for receiving data, the apparatus including a transceiver, and at least one processor connected with the transceiver, wherein the processor is configured to read and execute programs in a memory to: determine a first identifier carried in at least one synchronization signal (SI) upon detecting the SI; detect system information corresponding to the SI, and determine a second identifier according to the system information, wherein the system information carries information representing the second identifier, wherein identification information of a transmitter transmitting the SI includes the first identifier and the second identifier; and the transceiver is configured to receive and transmit data under the control of the processor.

Optionally, the processor is configured to read and execute the programs in the memory to: determine the first identifier according to a sequence of the SI; or determine a de-scrambling code of the SI as the first identifier; or determine the first identifier from bit information in the SI, wherein the bit information in the SI carries information representing the first identifier.

Optionally, the processor is configured to read and execute the programs in the memory to: descramble a received signal according to the first identifier; or determine a reference signal of the system information according to the first identifier, and detect the system information according to the reference signal.

Optionally, the processor is configured to read and execute the programs in the memory to: determine a candidate time-frequency position of system information, corresponding to the SI, and detect the system information corresponding to the SI at the candidate time-frequency position of system information; wherein the processor is configured to read and execute the programs in the memory to determine the candidate time-frequency position of system information, corresponding to the SI by: determining the candidate time-frequency position of system information, corresponding to the SI according to a time-frequency position of the SI and a first mapping relationship, wherein the first mapping relationship characterizes a correspondence relationship between the time-frequency position of the SI, and a time-frequency position of system information, corresponding to the SI; or determining the candidate time-frequency position of system information, corresponding to the SI according to the first identifier and a second mapping relationship, wherein the second mapping relationship characterizes a correspondence relationship between the first identifier corresponding to the SI, and a time-frequency position of system information, corresponding to the SI; or determining the candidate time-frequency position of system information, corresponding to the SI according to a predefined set of time-frequency positions.

Optionally, the processor is configured to read and execute the programs in the memory to: determine the second identifier according to the information representing the second identifier and a predefined first constraint condition; or determine the second identifier according to the first identifier, the information representing the second identifier and a predefined second constraint condition.

In the methods and apparatuses according to the embodiments of the invention, the receiver can obtain the first identifier according to the mapping relationship between the SI and the first identifier upon detecting the SI; and the information representing the second identifier is carried in the system information so that the receiver can obtain the second identifier upon detecting the system information. In this way, the receiver can obtain all the identification information of the transmitter according to the first identifier and the second identifier, thus improving the flexibility of an access to a network.

DETAILED DESCRIPTION OF THE EMBODIMENTS

Figure 1:
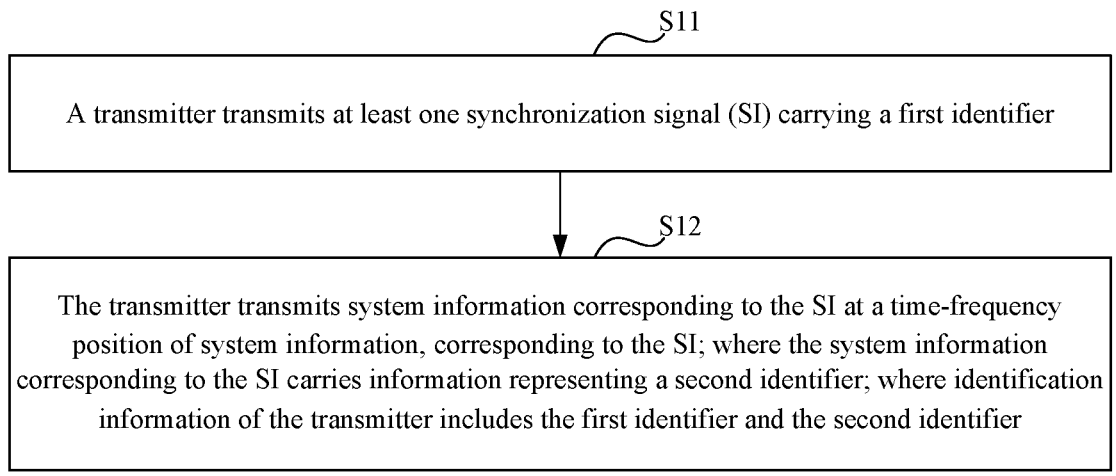
FIG. 1 is a schematic flow chart of a method for transmitting data according to an embodiment of the invention.

In order to make the objects, technical solutions, and advantages of the embodiments of the invention more apparent, the technical solutions according to the embodiments of the invention will be described below clearly and fully with reference to the drawings in the embodiments of the invention, and apparently the embodiments to be described below are only a part but not all of the embodiments of the invention. Based upon the embodiments here of the invention, all the other embodiments which can occur to those ordinarily skilled in the art without any inventive effort shall fall into the scope of the invention.

In the embodiments of the invention, the apparatuses as referred to include a transmitting apparatus (i.e., a transmitter) and a receiving apparatus (i.e., a receiver), and downlink transmission and uplink reception can be conducted between the transmitting apparatus, and the receiving apparatus accessing the transmitting apparatus. The transmitting apparatus can transmit one or more synchronization signals (SIs), and the receiving apparatus can receive the synchronization signal(s) transmitted by the transmitting apparatus, and can access a network according to the received synchronization signal(s).

Here the transmitting apparatus can be a base station or another type of transmission point apparatus and the receiving apparatus can be a user apparatus (or a terminal). Of course, they will not be limited thereto, and for example, the transmitting apparatus can alternatively be a terminal capable of configuring another terminal. Alternatively a transmitting apparatus can include a plurality of network nodes. A network node may include only a radio frequency component (e.g., a Remote Radio Unit (RRU)), or both a baseband component and a radio frequency component (e.g., an active antenna). The network node may include only a baseband component (e.g., a Base Band Unit (BBU)); or may not include any digital or radio frequency function at the air-interface layer at all, and may be only responsible for processing a higher-layer signal, and baseband processing at the air-interface layer may be performed by the active antenna. There may be also a number of other possible network implementations.

The terminal can also referred to as a User Equipment (UE), or can be referred to as a terminal, a Mobile Station (MS), a mobile terminal, etc., and the terminal can communicate with one or more core networks through a Radio Access Network (RAN). For example, the terminal can be a mobile phone (or a "cellular" phone), a computer with a mobile terminal, etc., and for example, the terminal can also be a portable, pocket, handheld, built-in-computer or on-vehicle mobile apparatus, all of which exchange voice and/or data with the radio access network. The terminal in the embodiments of the invention can also be a Device to Device (D2D) terminal or a Machine to Machine (M2M) terminal.

In order to describe the technical solutions according to the embodiments of the invention, the terms "first", "second", etc., have been and will be used to distinguish identification information of a transmitter from each other, but the number of pieces of information and their operational priorities will not be limited thereto; and a first identifier includes a part of the identification information of the transmitter, and a second identifier includes a part or all of the other identification information of the transmitter than the first identifier.

The identification information of the transmitter in the embodiments of the invention includes but will not be limited to one or a combination of the following information: identification information identifying an area where the transmitter is located, identification information identifying the transmitter, or identification information identifying a beam for the transmitter to transmit the SI.

Optionally, the identification information identifying the area where the transmitter is located can be an area ID identifying the area uniquely; or can include an ID of an area group including the area where the transmitted is located, and an ID of the area, where the transmitted is located, in the area group.

Optionally, the identification information identifying the transmitter can be a TRP ID identifying the transmitter uniquely, or can include an ID of a TRP group including the transmitter, and an ID of the transmitter in the TRP group.

Optionally, the identification information identifying the beam for the transmitter to transmit the SI can be an ID identifying the beam uniquely, or can include an ID of a beam group including the beam for the transmitter to transmit the SI, and an ID of the beam in the beam group.

For example, the first identifier is an area ID, and the second identifier is a TRP ID and a beam ID. In another example, the first identifier is an area ID and a TRP ID, and the second identifier is a beam ID. In another example, the first identifier is an area ID and a beam ID, and the second identifier is a TRP ID. In another example, the first identifier is an area ID, and the second identifier is a TRP ID. In another example, the first identifier is an ID of an area group, and the second identifier is an ID of the area, where the transmitter is located, in the area group, a TRP ID, and a beam ID. In another example, the first identifier is an ID of an area group, an ID of the area, where the transmitter is located, in the area group, and an ID of a TRP group, and the second identifier is an ID of the transmitter in the TRP group.

The term "plurality of" as referred to in the embodiments of the invention represents two or more than two.

"Area" as referred to in the embodiments of the invention can correspond to one or more traditional cells, or can correspond to one or more system information areas, or can correspond to one or more network areas. Of course, the area can alternatively be defined otherwise, but will not be limited thereto in the embodiments of the invention.

The embodiments of the invention will be described below in further details with reference to the drawings. It shall be appreciated that the embodiments to be described are only intended to illustrate and explain the invention, but not to limit the invention thereto.

In an embodiment as illustrated in FIG. 1, there is provided a method for transmitting data at the transmitter side, where the method includes the following operations.

In the operation S11, a transmitter transmits at least one synchronization signal (SI) carrying a first identifier.

In the operation S12, the transmitter transmits system information corresponding to the SI at a time-frequency position of system information, corresponding to the SI; where the system information corresponding to the SI carries information representing a second identifier; where identification information of the transmitter includes the first identifier and the second identifier.

In the embodiment of the invention, a receiver can obtain the first identifier according to a mapping relationship between the SI and the first identifier upon detecting the SI; and the information representing the second identifier is carried in the system information so that the receiver can obtain the second identifier upon detecting the system information. In this way, the receiver can obtain all the identification information of the transmitter according to the first identifier and the second identifier, thus improving the flexibility of an access to a network.

In the embodiment of the invention, an area (e.g., a cell) includes one or more transmitters, and each transmitter can transmit one or more SIs in the area. The number of SIs transmitted in the area can be determined according to the number of beams, and for example, the number of SIs transmitted in the area is the same as the number of beams; or the number of SIs transmitted in the area can be determined according to the number of transmitters (e.g., TRPs) in the area, and for example, the number of SIs transmitted in the area is the same as the number of TRPs in the area.

The numbers of SIs transmitted in different areas may or may not be the same. Time-frequency positions at which the SIs are transmitted in the different areas may or may not be the same.

For example, an area corresponds to a cell, and a radio network provides a wide coverage area. The radio network covers a plurality of cells, and each cell covers a different range. A cell is defined as a radio network object for an access to the network, and each cell corresponds to a unique cell ID broadcasted in the cell. A cell can include one or more TRPs, and each TRP includes one or more antennas. The antennas on the TRP can operate with beam-forming, and a downlink signal can be transmitted over the antenna after being beam-formed. Each beam provides wide or narrow coverage dependent upon the number of antennas and a beam-forming scheme. A cell transmits one or more synchronization signals (SIs) in the downlink to thereby improve network coverage. In a possible implementation, each TRP in a cell transmits a separate SI; each SI is transmitted from the TRP through wide beam-forming to provide the corresponding TRP with wide coverage. In this case, the plurality of SIs cover an area covered by all the TRPs throughout the cell. In another possible implementation, the plurality of SIs are transmitted over a plurality of beam-formed beams, that is, each TRP in the cell transmits an SI over each beam to point into some direction, and the plurality of beam-formed beams provide coverage throughout the cell.

In the embodiment of the invention, the same or different sequences can be applied to SIs transmitted in an area, and the sequence(s) of the SIs can be a base sequence or a cyclically shifted sequence.

In the embodiment of the invention, the system information includes but will not be limited to at least one of the following transmission parameters: a downlink system bandwidth, a Physical Hybrid-ARQ Indicator Channel (PHICH, where ARQ stands for Automatic Repeat Request) resource indicator, a System Frame Number (SFN), or the number of antenna ports, etc.

In a possible implementation, the system information corresponds to a Master Information Block (MIB) in an LTE system.

In the embodiment of the invention, the information representing the second identifier includes but will not be limited to the following three possible implementations.

Firstly, the information representing the second identifier is the second identifier.

For example, the second identifier is a TRP ID, so the information representing the second identifier is the TRP ID.

Secondly, the information representing the second identifier and the second identifier satisfies a predefined first constraint condition.

For example, the second identifier corresponding to the SI is a sum of the information representing the second identifier and a preset value; in another example, the second identifier corresponding to the SI is f(y), where f( ) is a preset function, and y is the information representing the second identifier; in another example, the second identifier corresponding to the SI is f1(y1, y2), where f1( ) is a preset function, and y1 and y2 is the information representing the second identifier; etc. The first constraint condition will not be limited to any particular implementation in the embodiment of the invention.

Thirdly, the information representing the second identifier, the first identifier, and the second identifier satisfies a predefined second constraint condition.

For example, the second identifier corresponding to the SI is g(x, y), where g( ) is a preset function, x is the first identifier, and y is the information representing the second identifier. The second constraint condition will not be limited to any particular implementation in the embodiment of the invention.

Further to any one of the embodiments above, the SI carries the first identifier in the following three possible implementations.

In a first implementation, a sequence of the SI is generated based upon the first identifier.

In this implementation, the transmitter generates the sequence of the SI according to the first identifier.

Particularly, the transmitter can generate a base sequence of the SI according to the first identifier, or can generate a cyclically shifted sequence of the SI according to the first identifier.

Correspondingly, the receiver can detect a received signal using candidate values of the first identifier, determine that the SI is detected upon detecting the received signal successfully using any one of the candidate values, and determine the any one candidate value as the first identifier corresponding to the SI.

Here the candidate values of the first identifier can be all the possible first identifiers in the network, or can be configured at the network side, or can be predefined in a protocol.

In a second implementation, the SI is scrambled based upon the first identifier.

In this implementation, the transmitter scrambles the SI using the first identifier.

Correspondingly, the receiver can decode a received signal using candidate values of the first identifier, determine that the SI is detected upon decoding the received signal successfully using any one of the candidate values, and determine the any one candidate value as the first identifier corresponding to the SI.

Here the candidate values of the first identifier can be all the possible first identifiers in the network, or can be configured at the network side, or can be predefined in a protocol.

In a third implementation, bit information in the SI carries information representing the first identifier.

In this implementation, the transmitter carries the information representing the first identifier corresponding to the SI, in the bit information in the SI.

Particularly, the information representing the first identifier corresponding to the SI includes but will not be limited to the following two possible implementations.

Firstly, the information representing the first identifier corresponding to the SI is the first identifier.

For example, the first identifier is an area ID, so the information representing the first identifier corresponding to the SI is the area ID.

Secondly, the information representing the first identifier corresponding to the SI, and the first identifier satisfies a preset constraint condition.

For example, the information representing the first identifier corresponding to the SI is a sum of the first identifier and a preset value; in another example, the information representing the first identifier corresponding to the SI is a multiple of the first identifier; in another example, the information representing the first identifier corresponding to the SI is f(x), where f( ) is a preset function, and x is the first identifier; etc. The constraint condition will not be limited to any particular implementation in the embodiment of the invention.

Correspondingly, the receiver obtains the information representing the first identifier directly from the SI upon detecting the SI successfully.

Particularly, if the information representing the first identifier is the first identifier itself, then the receiver will obtain the first identifier directly; and if the information representing the first identifier is a value satisfying a preset constrain condition with the first identifier, then the receiver will determine the first identifier according to the preset constraint condition after obtaining the information representing the first identifier.

Further to any one of the embodiments above, in a possible implementation, a time-frequency position of system information, corresponding to the SI is predefined, and the transmitter can transmit system information corresponding to the SI at the predefined time-frequency position.

For example, a position, of the system information corresponding to the SI, in the frequency domain is defined in a first mapping relationship as M Physical Resource Blocks (PRBs) centered at a central frequency, where M is a positive integer.

Particularly, there are the following two possible implementations in this implementation.

Firstly, one time-frequency position of system information, corresponding to the SI is predefined, so the transmitter transmits the system information corresponding to the SI directly at the time-frequency position.

Secondly, a plurality of time-frequency positions of system information, corresponding to the SI are predefined, that is, a set of time-frequency positions is predefined, so the transmitter selects a time-frequency position from the predefined set of time-frequency positions, and determines it as the time-frequency position of system information, corresponding to the SI.

In another possible implementation, a correspondence relationship between an SI and a time-frequency position of system information, corresponding to the SI is pre-created, particularly in the following two possible implementations.

In a first implementation, a correspondence relationship between a time-frequency position of an SI, and a time-frequency position of system information is defined via a first mapping relationship, where in the first mapping relationship, a time-frequency position of one SI may correspond to a time-frequency position of one piece of system information, or time-frequency positions of a plurality of SIs may correspond to a time-frequency position of one piece of system information. Furthermore, a time-frequency position of a piece of system information defined in the first mapping relationship may include one or more positions.

For example, a frequency domain position of system information, corresponding to an SI is defined in the first mapping relationship as a frequency domain position of the SI offset by N resource elements (e.g., PRBs, Resource Elements (REs), etc.).

In this implementation, the first mapping relationship can be determined and then notified by the transmitter to the receiver, or can be predefined in a protocol.

In this implementation, the transmitter determines the time-frequency position of system information, corresponding to the SI in the following operation: the transmitter determines the time-frequency position of system information, corresponding to the SI according to a time-frequency position of the SI, and the first mapping relationship.

In this implementation, if the transmitter determines one time-frequency position of system information, corresponding to the SI according to the time-frequency position of the SI and the first mapping relationship, then it will transmit the system information directly at the time-frequency position.

If the transmitter determines at least two time-frequency positions of system information, corresponding to the SI according to the time-frequency position of the SI, and the first mapping relationship, then it will selects one of the at least two time-frequency positions as the time-frequency position of system information.

In a second implementation, a second mapping relationship is defined to characterize a correspondence relationship between a first identifier corresponding to an SI, and a time-frequency position of system information, corresponding to the SI; where in the second mapping relationship, a first identifier corresponding to one SI may correspond to a time-frequency position of one piece of system information, or first identifiers corresponding to a plurality of SIs may correspond to a time-frequency position of one piece of system information. Furthermore, a time-frequency position of a piece of system information defined in the second mapping relationship may include one or more positions.

For example, the second mapping relationship can be determined and then notified by the transmitter to the receiver, or can be predefined in a protocol.

In this implementation, the transmitter determines the time-frequency position of system information, corresponding to the SI in the following operation: the transmitter determines the time-frequency position of system information, corresponding to the SI according to the first identifier and the second mapping relationship.

In this implementation, if the transmitter determines one time-frequency position of system information, corresponding to the first identifier according to the first identifier and the second mapping relationship, then it will transmit the system information directly at the time-frequency position.

If the transmitter determines at least two time-frequency positions of system information, corresponding to the first identifier according to the first identifier and the second mapping relationship, then it will selects one of the at least two time-frequency positions as the time-frequency position of system information.

It shall be noted that, in the embodiment of the invention, a time-frequency position includes a time domain position and/or a frequency domain position; where a time-frequency position of an SI may be a start position, an intermediate position, or an end position of a time-frequency resource occupied by the SI; and a time-frequency position of a piece of system information may be a start position, an intermediate position, or an end position of a time-frequency resource occupied by the system information.

Further to any one of the embodiments above, in a possible implementation, the correspondence relationship between the system information and the first identifier can be created particularly in the following two possible implementations.

In an implementation A, the transmitter scrambles the system information using the first identifier; and in an implementation B, the transmitter generates a reference signal of the system information according to the first identifier.

Of course, the correspondence relationship between the system information and the first identifier may not be created, and the transmitter may scramble the system information in another scrambling scheme. For example, it can scramble the system information using a preconfigured scrambling code; in another example, it can select a scrambling code from a preconfigured set of scrambling codes to scramble the system information; etc.

Further to any one of the embodiments above, in a possible implementation, an SI may include a plurality of components, and respective components may or may not be the same. The plurality of components in the SI can be distinguished in a Frequency Division Multiplexing (FDM), Time Division Multiplexing (TDM), a Code Division Multiplexing (CDM), and/or another multiplexing pattern.

Optionally, different SIs in an area can be distinguished in an FDM, TDM, CDM, and/or another multiplexing pattern.

Optionally, different components in different SIs in an area can be distinguished in an FDM, TDM, CDM, and/or another multiplexing pattern.

Figure 2:
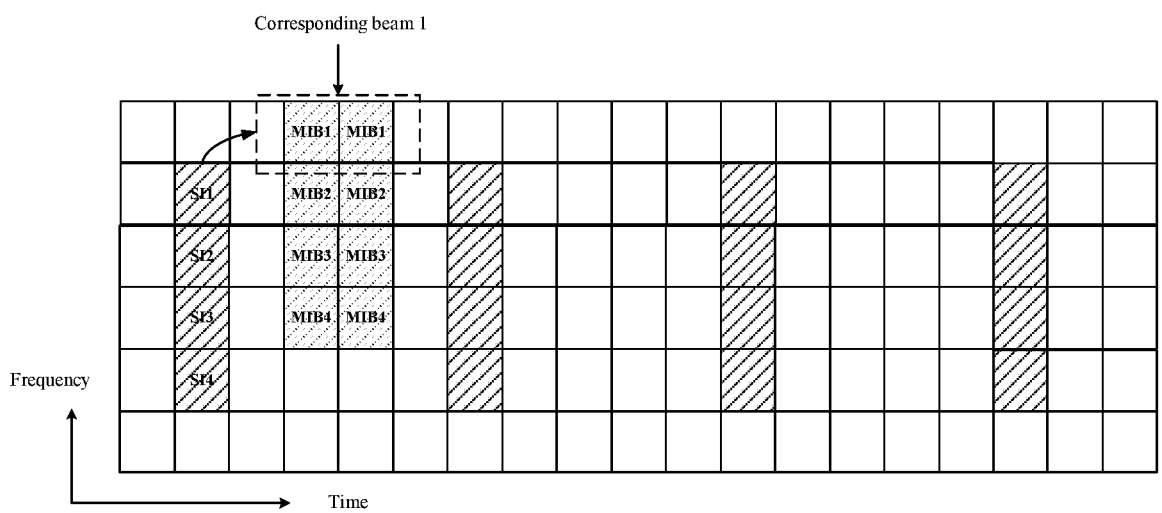
FIG. 2 is a schematic diagram of transmitting an SI and system information according to an embodiment of the invention.

By way of an example, in an embodiment as illustrated in FIG. 2, there is illustrated a possible scheme to transmit an SI and system information, and in FIG. 2, the transmitter transmits four SIs over different beams at the same instance of time, that is, an SI1 over a beam 1, an SI2 over a beam 2, an SI3 over a beam 3, and an SI4 over a beam 4, where these four SIs are multiplexed in an FDM pattern, and each SI corresponds to a piece of system information (e.g., an MIB), that is, the SI1 corresponds to an MIB1, the SI2 corresponds to an MIB2, the SI3 corresponds to an MIB3, and the SI4 corresponds to an MIB4. The SIs carry the first identifier of the transmitter, and the MIBs carry the second identifier thereof. In an embodiment, the first identifier is a cell ID of the transmitter, the second identifier is an ID of a beam for beam-forming the SI, and sequences of the SIs are generated based upon the cell ID. In this embodiment, the sequences of the four SIs are exactly the same, and corresponding information about the first ID is also exactly the same.

In a possible implementation, each SI includes at least two sub-signals, the first identifier includes at least two first sub-identifiers, each sub-signal corresponds to one of the first sub-identifiers, and different sub-signals correspond to different first sub-identifiers.

For example, each SI includes two sub-signals (components), i.e., a PSS and an SSS, the first identifier is a cell ID, and the cell ID further includes two first sub-identifiers, i.e., a sector ID and an intra-group ID, where the PSS corresponds to the sector ID, and has three values; and the SSS corresponds to the intra-group ID, and has 128 values, so there may be 504 corresponding cell IDs.

In this implementation, the transmitter can generate the sequence of the SI according to the first identifier corresponding to the SI by generating the sequence of the SI according to any one of the first sub-identifiers; or by generating sequences of different sub-signals of the SI according to different first sub-identifiers; etc. The embodiment of the invention will not be limited to any particular implementation thereof.

In this implementation, the transmitter can scramble the SI using the first identifier corresponding to the SI by scrambling the SI using any one of the first sub-identifiers; or by scrambling different sub-signals of the SI using different first sub-identifiers; etc. The embodiment of the invention will not be limited to any particular implementation thereof.

Figure 3:
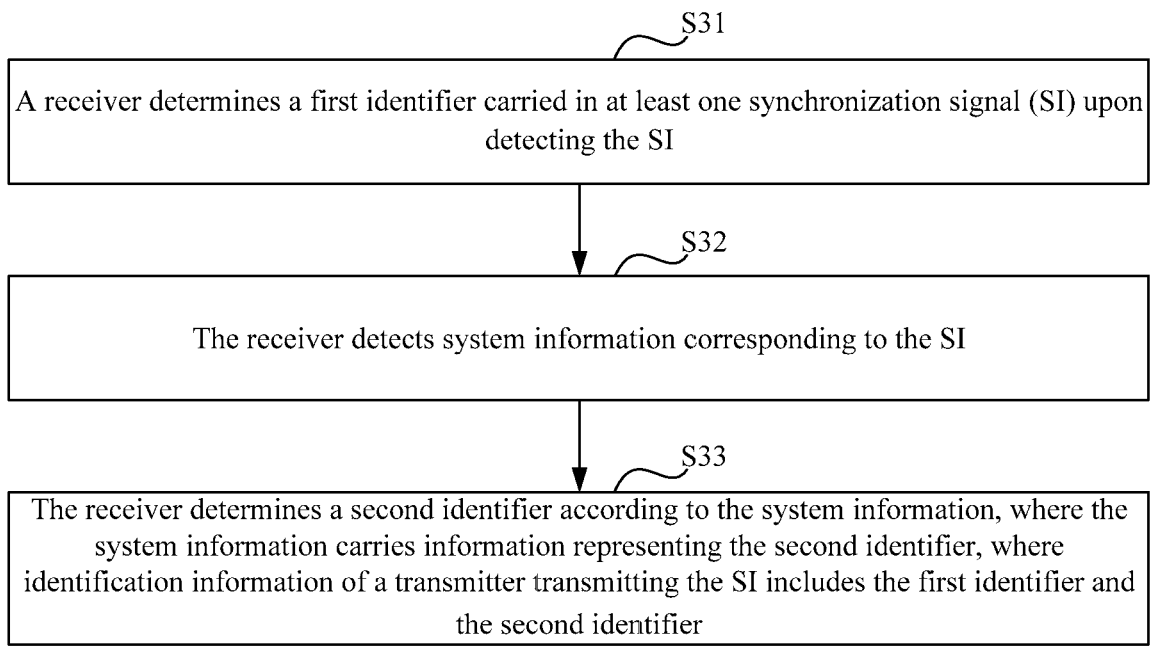
FIG. 3 is a schematic flow chart of a method for receiving data according to an embodiment of the invention.

Based upon the same inventive idea, in an embodiment as illustrated in FIG. 3, there is provided a method for receiving data at the receiver side, where the method includes the following operations.

In the operation S31, a receiver determines a first identifier carried in at least one synchronization signal (SI) upon detecting the SI.

In this operation, the receiver can detect each SI separately, or can detect a plurality of SIs jointly, in an area. If the SIs are detected jointly, then a user will delete each detected SI from a received signal upon detection of the SI, and so on.

Optionally, if a transmitter transmits a plurality of SIs, then the receiver may detect each SI, or may stop detecting an SI upon detecting the first SI.

In the operation S32, the receiver detects system information corresponding to the SI.

In the operation S33, the receiver determines a second identifier according to the system information, where the system information carries information representing the second identifier; here identification information of a transmitter transmitting the SI includes the first identifier and the second identifier.

In the embodiment of the invention, a receiver can obtain the first identifier according to a mapping relationship between the SI and the first identifier upon detecting the SI; and the information representing the second identifier is carried in the system information so that the receiver can obtain the second identifier upon detecting the system information. In this way, the receiver can obtain all the identification information of the transmitter according to the first identifier and the second identifier, where the identification information can be used for an initial access, a cell reselection, a cell switching, etc., thus improving the flexibility of an access to a network.

In a possible implementation, the receiver determines the first identifier carried in the at least one SI upon detecting the SI in the operation S31 as follows.

The receiver determines the first identifier according to a sequence of the SI, and this corresponds to the first implementation above, so reference can be made to the description in the embodiment as illustrated in FIG. 1 for details thereof.

Or, the receiver determines a de-scrambling code of the SI as the first identifier, and this corresponds to the second implementation above, so reference can be made to the description in the embodiment as illustrated in FIG. 1 for details thereof.

Or, the receiver determines the first identifier from bit information in the SI, where the bit information in the SI carries information representing the first identifier, and this corresponds to the third implementation above, so reference can be made to the description in the embodiment as illustrated in FIG. 1 for details thereof.

It shall be noted that, the receiver detects the SI by generating sequences using possible values of the first identifier, and detecting the received signal using these sequences to determine whether the received signal is an SI; or the receiver detects the SI by descrambling the received signal using possible values of the first identifier, and detecting the SI only upon successful descrambling, where the possible values of the first identifier are determined and then notified by the transmitter to the receiver, or predefined in a protocol. Here in a possible implementation in which the receiver generates the sequences using the possible values of the first identifier, and detecting the received signal using these sequences, the receiver correlates a locally generated sequence with the received signal, and determines an SI is detected if a peak after correlation is above a given threshold. A sequence corresponding to the SI is the locally generated sequence, and the corresponding value of the first identifier is the first identifier for generating the locally generated sequence.

In a possible implementation, the receiver detects the system information corresponding to the SI in the operation S32 as follows.

The receiver descrambles a received signal according to the first identifier, and this corresponds to the implementation A above, so reference can be made to the description in the embodiment as illustrated in FIG. 1 for details thereof; or the receiver determines a reference signal of the system information according to the first identifier, and detects the system information according to the reference signal, and this corresponds to the implementation B above, so reference can be made to the description in the embodiment as illustrated in FIG. 1 for details thereof.

Of course, the correspondence relationship between the system information and the first identifier may not be created, and the receiver can descramble the received signal in another descrambling scheme, and determine the system information is detected upon successful descrambling. For example, the receiver can descramble the received signal using a preconfigured descrambling code, and determine the system information is detected upon successful descrambling; in another example, the receiver can traverse each descrambling code in a preconfigured set of descrambling codes, descramble the received signal, and determine the system information is detected upon successful descrambling; etc.

Further to any one of the embodiments above, the receiver detects the system information corresponding to the SI in the operation S32 particularly as follows: the receiver determines a candidate time-frequency position of system information, corresponding to the SI, and detects the system information corresponding to the SI at the candidate time-frequency position of system information.

In a possible implementation, the receiver determines the candidate time-frequency position of system information as follows: the receiver determines the candidate time-frequency position of system information, corresponding to the SI according to a predefined set of time-frequency positions.

In another possible implementation, the receiver determines the candidate time-frequency position of system information as follows.

The receiver determines the candidate time-frequency position of system information, corresponding to the SI according to a time-frequency position of the SI and a first mapping relationship, where the first mapping relationship characterizes a correspondence relationship between the time-frequency position of the SI, and a time-frequency position of system information, and this corresponds to the first implementation above, so reference can be made to the description in the embodiment as illustrated in FIG. 1 for details thereof.

Or, the receiver determines the candidate time-frequency position of system information, corresponding to the SI according to the first identifier and a second mapping relationship, where the second mapping relationship characterizes a correspondence relationship between the first identifier corresponding to the SI, and a time-frequency position of system information, corresponding to the SI, and this corresponds to the second implementation above, so reference can be made to the description in the embodiment as illustrated in FIG. 1 for details thereof.

Particularly, the receiver needs to detect at each candidate time-frequency position.

Further to any one of the embodiments above, optionally, the receiver determines the second identifier according to the system information in the operation S33 as follows.

The receiver determines the second identifier according to the information representing the second identifier, and a predefined first constraint condition; or the receiver determines the second identifier according to the first identifier, the information representing the second identifier, and a predefined second constraint condition.

The processing flows of the methods above can be performed in a software program, the software program can be stored in a storage medium, and when the stored software program is invoked, it can perform the operations in the methods above.

Based upon the same inventive idea, an embodiment of the invention further provides an apparatus for transmitting data, and since the apparatus addresses the problem under a similar principle to the method for transmitting data as illustrated in FIG. 1, reference can be made to the implementation of the method for an implementation of the apparatus, and a repeated description thereof will be omitted here.

Figure 4:
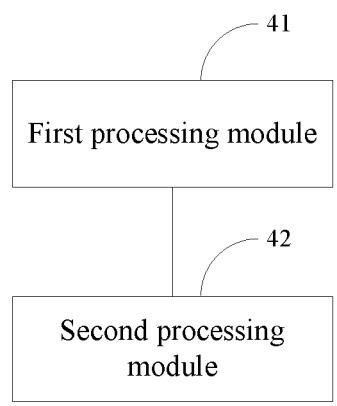
FIG. 4 is a schematic diagram of an apparatus for transmitting data according to an embodiment of the invention.

In an embodiment as illustrated in FIG. 4, there is provided an apparatus for transmitting data, where the transmitting apparatus includes: a first processing module 41 configured to transmit at least one synchronization signal (SI) carrying a first identifier; and a second processing module 42 configured to transmit system information corresponding to the SI at a time-frequency position of system information, corresponding to the SI, where the system information corresponding to the SI carries information representing a second identifier; where identification information of a transmitter includes the first identifier and the second identifier.

Optionally, carrying the first identifier in the SI includes: a sequence of the SI is generated according to the first identifier; or the SI is scrambled using the first identifier; or information representing the first identifier is carried in bit information in the SI.

Optionally, the second processing module is further configured to: scramble the system information corresponding to the SI using the first identifier; or generate a reference signal of the system information corresponding to the SI according to the first identifier.

Optionally, the second processing module is further configured to: determine the time-frequency position of system information, corresponding to the SI according to a time-frequency position of the SI and a first mapping relationship, where the first mapping relationship characterizes a correspondence relationship between the time-frequency position of the SI, and the time-frequency position of system information; or determine the time-frequency position of system information, corresponding to the SI according to the first identifier and a second mapping relationship, where the second mapping relationship characterizes a correspondence relationship between the first identifier corresponding to the SI, and the time-frequency position of system information, corresponding to the SI; or determine the time-frequency position of system information, corresponding to the SI according to a predefined set of time-frequency positions, where the set of time-frequency positions includes the time-frequency position of system information, corresponding to the SI.

Optionally, if there are at least two time-frequency positions of system information, corresponding to the SI, then the second processing module is configured to select one of the at least two time-frequency positions as the time-frequency position of system information.

Figure 5:
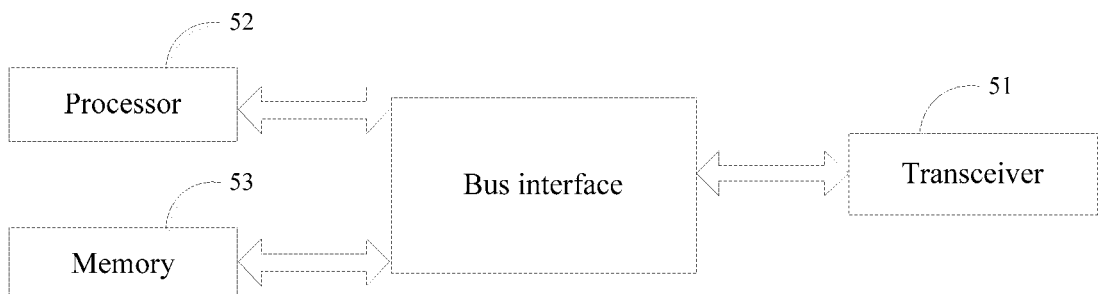
FIG. 5 is a schematic diagram of another apparatus for transmitting data according to an embodiment of the invention.

In an embodiment as illustrated in FIG. 5, a hardware structure and a processing mode of the transmitting apparatus according to the embodiment of the invention will be described by way of an example in which the transmitter is a network node. The transmitting apparatus includes: a transceiver 51 and at least one processor 52 connected with the transceiver 51.

Where the processor 52 is configured to read and execute programs in a memory 53 to: transmit at least one synchronization signal (SI) carrying a first identifier through the transceiver, and transmit system information corresponding to the SI through the transceiver at a time-frequency position of system information, corresponding to the SI; where the system information corresponding to the SI carries information representing a second identifier; and the transceiver 51 is configured to receive and transmit data under the control of the processor 52; where identification information of the transmitter includes the first identifier and the second identifier.

Here in FIG. 5, the bus architecture can include any number of interconnecting buses and bridges to particularly link together various circuits including one or more processors represented by the processor 52, and one or more memories represented by the memory 53. The bus can further link together various other circuits, e.g., a peripheral device, a manostat, a power management circuit, etc., all of which are well known in the art, so a further description thereof will be omitted in this context. The bus interface serves as an interface. The transceiver 51 can be a number of elements, e.g., a transmitter and a receiver, which are units for communication with various other devices over a transmission medium.

The processor 52 is responsible for managing the bus architecture and performing normal processes, and the memory 53 can store data for use by the processor 52 in performing the operations.

Optionally, carrying the first identifier in the SI includes: a sequence of the SI is generated according to the first identifier; or the SI is scrambled using the first identifier; or information representing the first identifier is carried in bit information in the SI.

Optionally, the processor is further configured to read and execute the programs in the memory to: scramble the system information corresponding to the SI using the first identifier; or generate a reference signal of the system information corresponding to the SI according to the first identifier.

Optionally, the processor is further configured to read and execute the programs in the memory to: determine the time-frequency position of system information, corresponding to the SI according to a time-frequency position of the SI and a first mapping relationship, where the first mapping relationship characterizes a correspondence relationship between a time-frequency position of the SI, and the time-frequency position of system information; or determine the time-frequency position of system information, corresponding to the SI according to the first identifier and a second mapping relationship, where the second mapping relationship characterizes a correspondence relationship between the first identifier corresponding to the SI, and the time-frequency position of system information corresponding to the SI; or determine the time-frequency position of system information, corresponding to the SI according to a predefined set of time-frequency positions, where the set of time-frequency positions includes the time-frequency position of system information, corresponding to the SI.

Optionally, if there are at least two time-frequency positions of system information, corresponding to the SI, then the processor is configured to read and execute the programs in the memory to select one of the at least two time-frequency positions as the time-frequency position of system information.

Based upon the same inventive idea, an embodiment of the invention further provides an apparatus for receiving data, and since the apparatus addresses the problem under a similar principle to the method for receiving data as illustrated in FIG. 3, reference can be made to the implementation of the method for an implementation of the apparatus, and a repeated description thereof will be omitted here.

Figure 6:
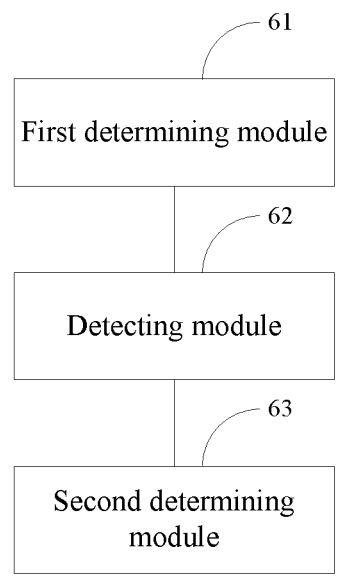
FIG. 6 is a schematic diagram of an apparatus for receiving data according to an embodiment of the invention.

In an embodiment as illustrated in FIG. 6, there is provided an apparatus for receiving data, where the receiving apparatus includes: a first determining module 61 configured to determine a first identifier carried in at least one synchronization signal (SI) upon detecting the SI; a detecting module 62 configured to detect system information corresponding to the SI; and a second determining module 63 configured to determine a second identifier according to the system information, where the system information carries information representing the second identifier; where identification information of a transmitter transmitting the SI includes the first identifier and the second identifier.

Optionally, the first determining module is configured to: determine the first identifier according to a sequence of the SI; or determine a de-scrambling code of the SI as the first identifier; or determine the first identifier from bit information in the SI, where the bit information in the SI carries information representing the first identifier.

Optionally, the detecting module is configured to: descramble a received signal according to the first identifier; or determine a reference signal of the system information according to the first identifier, and detect the system information according to the reference signal.

Optionally, the detecting module is configured to: determine a candidate time-frequency position of system information, corresponding to the SI, and detect the system information corresponding to the SI at the candidate time-frequency position of system information.

Where the detecting module is configured to determine the candidate time-frequency position of system information by: determining the candidate time-frequency position of system information, corresponding to the SI according to a time-frequency position of the SI and a first mapping relationship, where the first mapping relationship characterizes a correspondence relationship between the time-frequency position of the SI, and a time-frequency position of system information; or determining the candidate time-frequency position of system information, corresponding to the SI according to the first identifier and a second mapping relationship, where the second mapping relationship characterizes a correspondence relationship between the first identifier corresponding to the SI, and a time-frequency position of system information, corresponding to the SI; or determining the candidate time-frequency position of system information, corresponding to the SI according to a predefined set of time-frequency positions.

Optionally, the second determining module is configured to: determine the second identifier according to the information representing the second identifier, and a predefined first constraint condition; or determine the second identifier according to the first identifier, the information representing the second identifier, and a predefined second constraint condition.

Figure 7:
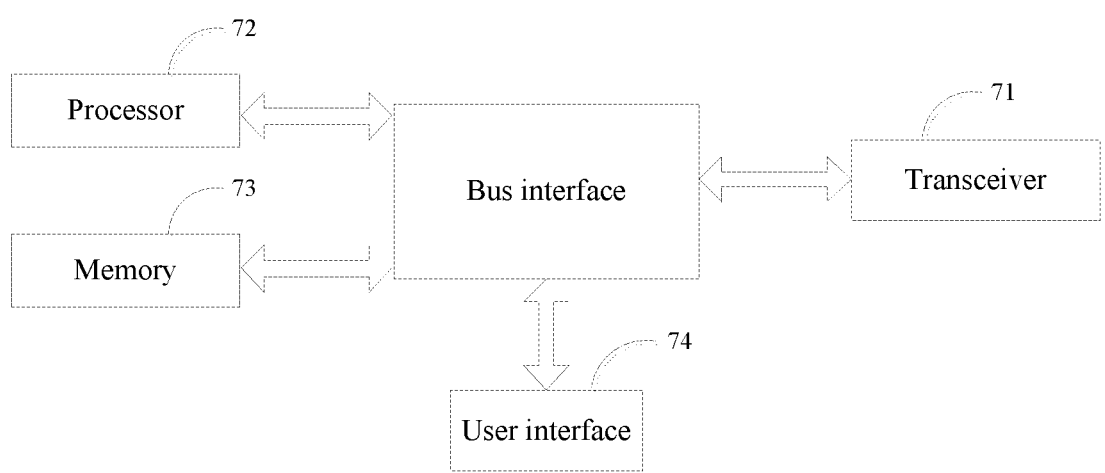
FIG. 7 is a schematic diagram of another apparatus for receiving data according to an embodiment of the invention.

In an embodiment as illustrated in FIG. 7, a hardware structure and a processing mode of the receiving apparatus according to the embodiment of the invention will be described by way of an example in which the receiver is a terminal. The receiving apparatus includes: a transceiver 71 and at least one processor 72 connected with the transceiver 71.

Where the processor 72 is configured to read and execute programs in a memory 73 to: determine a first identifier carried in at least one synchronization signal (SI) upon detecting the SI, where the first identifier includes a part of identification information of a transmitter transmitting the SI; detect system information corresponding to the SI at a time-frequency position of the system information; and determine a second identifier according to the system information, where the second identifier includes a part or all of the other identification information than the first identifier, and the system information carries information representing the second identifier.

The transceiver 71 is configured to receive and transmit data under the control of the processor 72.

Here in FIG. 7, the bus architecture can include any number of interconnecting buses and bridges to particularly link together various circuits including one or more processors represented by the processor 72, and one or more memories represented by the memory 73. The bus can further link together various other circuits, e.g., a peripheral device, a manostat, a power management circuit, etc., all of which are well known in the art, so a further description thereof will be omitted in this context. The bus interface serves as an interface. The transceiver 71 can be a number of elements, e.g., a transmitter and a receiver, which are units for communication with various other devices over a transmission medium. For different user equipment, the user interface 74 can also be an interface via which devices are connected internally and externally as needed, and the connected devices include but will not be limited to a keypad, a monitor, a speaker, a microphone, a joystick, etc.

The processor 72 is responsible for managing the bus architecture and performing normal processes, and the memory 73 can store data for use by the processor 72 in performing the operations.

Optionally, the processor is configured to read and execute the programs in the memory to: determine the first identifier according to a sequence of the SI; or determine a de-scrambling code of the SI as the first identifier; or determine the first identifier from bit information in the SI, where the bit information in the SI carries information representing the first identifier.

Optionally, the processor is configured to read and execute the programs in the memory to: descramble a received signal according to the first identifier; or determine a reference signal of the system information according to the first identifier, and detect the system information according to the reference signal.

Optionally, the processor is configured to read and execute the programs in the memory to: determine a candidate time-frequency position of system information, corresponding to the SI, and detect the system information corresponding to the SI at the candidate time-frequency position of system information.

Where the processor is configured to determine the candidate time-frequency position of system information by: determining the candidate time-frequency position of system information, corresponding to the SI according to a time-frequency position of the SI and a first mapping relationship, where the first mapping relationship characterizes a correspondence relationship between the time-frequency position of the SI, and a time-frequency position of system information; or determining the candidate time-frequency position of system information, corresponding to the SI according to the first identifier and a second mapping relationship, where the second mapping relationship characterizes a correspondence relationship between the first identifier corresponding to the SI, and a time-frequency position of system information, corresponding to the SI; or determining the candidate time-frequency position of system information, corresponding to the SI according to a predefined set of time-frequency positions.

Optionally, the processor is configured to read and execute the programs in the memory to: determine the second identifier according to the information representing the second identifier, and a predefined first constraint condition; or determine the second identifier according to the first identifier, the information representing the second identifier, and a predefined second constraint condition.

Those skilled in the art shall appreciate that the embodiments of the invention can be embodied as a method, a system or a computer program product. Therefore the invention can be embodied in the form of an all-hardware embodiment, an all-software embodiment or an embodiment of software and hardware in combination. Furthermore, the invention can be embodied in the form of a computer program product embodied in one or more computer useable storage mediums (including but not limited to a disk memory, a CD-ROM, an optical memory, etc.) in which computer useable program codes are contained.

The invention has been described in a flow chart and/or a block diagram of the method, the device (system) and the computer program product according to the embodiments of the invention. It shall be appreciated that respective flows and/or blocks in the flow chart and/or the block diagram and combinations of the flows and/or the blocks in the flow chart and/or the block diagram can be embodied in computer program instructions. These computer program instructions can be loaded onto a general-purpose computer, a specific-purpose computer, an embedded processor or a processor of another programmable data processing device to produce a machine so that the instructions executed on the computer or the processor of the other programmable data processing device create means for performing the functions specified in the flow(s) of the flow chart and/or the block(s) of the block diagram.

These computer program instructions can also be stored into a computer readable memory capable of directing the computer or the other programmable data processing device to operate in a specific manner so that the instructions stored in the computer readable memory create an article of manufacture including instruction means which perform the functions specified in the flow(s) of the flow chart and/or the block(s) of the block diagram.

These computer program instructions can also be loaded onto the computer or the other programmable data processing device so that a series of operational steps are performed on the computer or the other programmable data processing device to create a computer implemented process so that the instructions executed on the computer or the other programmable device provide operations for performing the functions specified in the flow(s) of the flow chart and/or the block(s) of the block diagram.

Although the preferred embodiments of the invention have been described, those skilled in the art benefiting from the underlying inventive concept can make additional modifications and variations to these embodiments. Therefore the appended claims are intended to be construed as encompassing the preferred embodiments and all the modifications and variations coming into the scope of the invention.

Evidently those skilled in the art can make various modifications and variations to the invention without departing from the spirit and scope of the invention. Thus the invention is also intended to encompass these modifications and variations thereto so long as the modifications and variations come into the scope of the claims appended to the invention and their equivalents.

The invention claimed is:

1. A method for transmitting data, the method comprising:
transmitting, by a transmitter, at least one synchronization signal (SI) carrying a first identifier; and
transmitting, by the transmitter, system information at a time-frequency position of the system information corresponding to the SI; wherein the system information corresponding to the SI carries information representing a second identifier;
wherein identification information of the transmitter comprises the first identifier and the second identifier;
wherein the transmitter determines the time-frequency position of the system information corresponding to the SI as follows:
the transmitter determines the time-frequency position of system information, corresponding to the SI according to a time-frequency position of the SI and a first mapping relationship, wherein the first mapping relationship characterizes a correspondence relationship between the time-frequency position of the SI, and the time-frequency position of system information; or
the transmitter determines the time-frequency position of system information, corresponding to the SI according to the first identifier and a second mapping relationship, wherein the second mapping relationship characterizes a correspondence relationship between the first identifier corresponding to the SI, and the time-frequency position of system information, corresponding to the SI; or the transmitter determines the time-frequency position of system information, corresponding to the SI according to a predefined set of time-frequency positions, wherein the set of time-frequency positions comprises the time-frequency position of system information, corresponding to the SI.

2. The method according to claim 1, wherein carrying the first identifier in the SI comprises:
generating a sequence of the SI according to the first identifier; or
scrambling the SI using the first identifier; or
carrying information representing the first identifier in bit information in the SI.

3. The method according to claim 1, wherein the method further comprises:
scrambling, by the transmitter, the system information corresponding to the SI using the first identifier; or
generating, by the transmitter, a reference signal of the system information corresponding to the SI according to the first identifier.

4. The method according to claim 1, wherein the SI comprises at least two sub-signals, the first identifier comprises at least two first sub-identifiers, each sub-signal corresponds to one of the first sub-identifiers, and different sub-signals correspond to different first sub-identifiers.

5. The method according to claim 1, wherein the first identifier comprises at least one of following information: identification information identifying an area where the transmitter is located, identification information identifying the transmitter, or identification information identifying a beam for the transmitter to transmit the SI; and
the second identifier comprises at least one of following information: the identification information identifying the area where the transmitter is located, the identification information identifying the transmitter, or the identification information identifying the beam for the transmitter to transmit the SI.

6. A method for receiving data, the method comprising:
determining, by a receiver, a first identifier carried in at least one synchronization signal (SI) upon detecting the SI;
detecting, by the receiver, system information corresponding to the SI; and
determining, by the receiver, a second identifier according to the system information, wherein the system information carries information representing the second identifier;
wherein identification information of a transmitter transmitting the SI comprises the first identifier and the second identifier;
wherein detecting, by the receiver, the system information corresponding to the SI comprises:
determining, by the receiver, a candidate time-frequency position of system information, corresponding to the SI, and detecting the system information corresponding to the SI at the candidate time-frequency position of system information; wherein the receiver determines the candidate time-frequency position of system information as follows:
the receiver determines the candidate time-frequency position of system information, corresponding to the SI according to a time-frequency position of the SI and a first mapping relationship, wherein the first mapping relationship characterizes a correspondence relationship between the time-frequency position of the SI, and a time-frequency position of system information, corresponding to the SI; or the receiver determines the candidate time-frequency position of system information, corresponding to the SI according to the first identifier and a second mapping relationship, wherein the second mapping relationship characterizes a correspondence relationship between the first identifier corresponding to the SI, and a time-frequency position of system information, corresponding to the SI; or the receiver determines the candidate time-frequency position of system information, corresponding to the SI according to a predefined set of time-frequency positions.

7. The method according to claim 6, wherein determining, by the receiver, the first identifier carried in the at least one SI upon detecting the SI comprises:
determining, by the receiver, the first identifier according to a sequence of the SI; or
determining, by the receiver, a de-scrambling code of the SI as the first identifier; or
determining, by the receiver, the first identifier from bit information in the SI, wherein the bit information in the SI carries information representing the first identifier.

8. The method according to claim 6, wherein detecting, by the receiver, the system information at a candidate time-frequency position comprises:
descrambling, by the receiver, a received signal according to the first identifier; or
determining, by the receiver, a reference signal of the system information according to the first identifier, and detecting the system information according to the reference signal.

9. The method according to claim 6, wherein the SI comprises at least two sub-signals, the first identifier comprises at least two first sub-identifiers, each sub-signal corresponds to one of the first sub-identifiers, and different sub-signals correspond to different first sub-identifiers.

10. The method according to claim 6, wherein the first identifier comprises at least one of following information: identification information identifying an area where the transmitter is located, identification information identifying the transmitter, and identification information identifying a beam for the transmitter to transmit the SI; and
the second identifier comprises at least one of following information: the identification information identifying the area where the transmitter is located, the identification information identifying the transmitter, or the identification information identifying the beam for the transmitter to transmit the SI.

11. An apparatus for transmitting data, the apparatus comprises a transceiver, and at least one processor connected with the transceiver, wherein:
the processor is configured to read and execute programs in a memory to:
transmit at least one synchronization signal (SI) carrying a first identifier through the transceiver; and transmit system information through the transceiver at a time-frequency position of the system information corresponding to the SI; wherein the system information corresponding to the SI carries information representing a second identifier; wherein identification information of a transmitter comprises the first identifier and the second identifier; and
the transceiver is configured to receive and transmit data under control of the at least one processor;

wherein the at least one processor is further configured to:
determine the time-frequency position of system information, corresponding to the SI according to a time-frequency position of the SI and a first mapping relationship, wherein the first mapping relationship characterizes a correspondence relationship between the time-frequency position of the SI, and the time-frequency position of system information; or
determine the time-frequency position of system information, corresponding to the SI according to the first identifier and a second mapping relationship, wherein the second mapping relationship characterizes a correspondence relationship between the first identifier corresponding to the SI, and the time-frequency position of system information, corresponding to the SI; or
determine the time-frequency position of system information, corresponding to the SI according to a predefined set of time-frequency positions, wherein the set of time-frequency positions comprises the time-frequency position of system information, corresponding to the SI.

12. The apparatus according to claim 11, wherein carrying the first identifier in the SI comprises:
a sequence of the SI is generated according to the first identifier; or
the SI is scrambled using the first identifier; or
information representing the first identifier is carried in bit information in the SI.

13. The apparatus according to claim 11, wherein the at least one processor is further configured to:
scramble the system information corresponding to the SI using the first identifier; or
generate a reference signal of the system information corresponding to the SI according to the first identifier.

14. An apparatus for receiving data, the apparatus comprises a transceiver, and at least one processor connected with the transceiver, wherein:
the processor is configured to read and execute programs in a memory to:
determine a first identifier carried in at least one synchronization signal (SI) upon detecting the SI; detect system information corresponding to the SI; and determine a second identifier according to the system information, wherein the system information carries information representing the second identifier; wherein identification information of a transmitter transmitting the SI comprises the first identifier and the second identifier; and
the transceiver is configured to receive and transmit data under control of the at least one processor;
wherein the at least one processor is further configured to:
determine a candidate time-frequency position of system information, corresponding to the SI, and detect the system information corresponding to the SI at the candidate time-frequency position of system information;
wherein the at least one processor is configured to determine the candidate time-frequency position of system information by:
determining the candidate time-frequency position of system information, corresponding to the SI according to a time-frequency position of the SI and a first mapping relationship, wherein the first mapping relationship characterizes a correspondence relationship between the time-frequency position of the SI, and a time-frequency position of system information, corresponding to the SI; or
determining the candidate time-frequency position of system information, corresponding to the SI according to the first identifier and a second mapping relationship, wherein the second mapping relationship characterizes a correspondence relationship between the first identifier corresponding to the SI, and a time-frequency position of system information, corresponding to the SI; or
determining the candidate time-frequency position of system information, corresponding to the SI according to a predefined set of time-frequency positions.

15. The apparatus according to claim 14, wherein the at least one processor is further configured to:
determine the first identifier according to a sequence of the SI; or
determine a de-scrambling code of the SI as the first identifier; or
determine the first identifier from bit information in the SI, wherein the bit information in the SI carries information representing the first identifier.

16. The apparatus according to claim 14, wherein the at least one processor is further configured to:
descramble a received signal according to the first identifier; or
determine a reference signal of the system information according to the first identifier, and detect the system information according to the reference signal.

17. The method according to claim 1, wherein if there are at least two time-frequency positions of system information, corresponding to the SI, then the method further comprises:
selecting, by the transmitter, one of the at least two time-frequency positions as the time-frequency position of system information, corresponding to the SI.

18. The method according to claim 1, wherein the information representing the second identifier is the second identifier; or
the information representing the second identifier, and the second identifier satisfies a predefined first constraint condition; or
the information representing the second identifier, the first identifier, and the second identifier satisfies a predefined second constraint condition.

19. The method according to claim 6, wherein determining, by the receiver, the second identifier according to the system information comprises:
determining, by the receiver, the second identifier according to the information representing the second identifier, and a predefined first constraint condition; or
determining, by the receiver, the second identifier according to the first identifier, the information representing the second identifier, and a predefined second constraint condition.

20. The apparatus according to claim 14, wherein if there are at least two time-frequency positions of the system information corresponding to the SI, then the at least one processor is further configured to:
select one of the at least two time-frequency positions as the time-frequency position of the system information.

* * * * *